United States Patent [19]

Sekiyama et al.

[11] Patent Number: 4,882,906
[45] Date of Patent: Nov. 28, 1989

[54] ENGINE BRAKING SYSTEM

[75] Inventors: Shigeo Sekiyama; Masaki Okada, both of Kawasaki, Japan

[73] Assignee: Isuzu Motors Limited, Tokyo, Japan

[21] Appl. No.: 196,923

[22] Filed: May 20, 1988

[30] Foreign Application Priority Data

May 22, 1987 [JP] Japan ................................ 62-123941
May 30, 1987 [JP] Japan ................................ 63-136474

[51] Int. Cl.⁴ ............................................. F02G 5/00
[52] U.S. Cl. ..................................... 60/624; 417/364
[58] Field of Search ................ 60/607, 608, 614, 624; 417/364

[56] References Cited

U.S. PATENT DOCUMENTS

| | | | |
|---|---|---|---|
| 2,375,852 | 5/1945 | Kilchenmann | 60/624 X |
| 2,518,660 | 8/1950 | Browne | 60/608 X |
| 4,535,592 | 8/1985 | Zinsmeyer | 60/624 X |
| 4,718,235 | 1/1988 | Kawamura | 60/624 |
| 4,748,812 | 6/1988 | Okada et al. | 60/624 X |
| 4,800,726 | 1/1989 | Okada et al. | 60/624 X |

Primary Examiner—Michael Koczo
Attorney, Agent, or Firm—Dykema Gossett

[57] ABSTRACT

An engine braking system, includes an axial flow compressor connected to an output shaft of an engine so as to be driven by said output shaft and to discharge air or exhaust gas supplied thereto. The compression and discharging work performed by the axial flow compressor serves as a braking effort during engine braking. A second embodiment of the engine braking system includes a driving force transmission connection the rotating output shaft of the engine to a power turbine disposed in an exhaust passage of the engine during engine braking so as to transmit the rotative power of the output shaft to the power turbine. This system also includes a throttling mechanism for adjusting a nozzle throat area of the power turbine, which mechanism is provided with movable wing-type vanes circumferentially disposed relative to the power turbine. Finally, a controller is provided for controlling the system in accordance with various running conditions of the engine and vehicle.

27 Claims, 10 Drawing Sheets

ENGINE BRAKING SYSTEM

BACKGROUND OF THE INVENTION

1. Field of the Invention

The present invention relates to an engine braking system which makes an output shaft of an engine perform braking work against itself.

2. Background Art

In general, a large bus or a truck in which the heat-exchange upon friction braking is large, is equipped with an auxiliary braking device in addition to a main braking device. In conventional braking devices, the engine or a rotative resistor is driven by wheels of the vehicle so as to produce resistance loss which serves as a braking force.

Among such known braking arrangements, there are; those which include and use rotative resistors, fluid retarders and electric retarders. An example of a conventional engine braking system is shown in FIG. 9.

As shown in FIG. 9, the fluid retarder 201 is disposed within a driving force transmitting shaft 204 that connects the engine 202 to the wheels 203 of the vehicle, and an eddy is generated in fluid (for example, water or oil) between a rotor 205 fixed to the output side and a stator 206 fixed to the input side so that energy absorbed therein is transformed into heat. The fluid is cooled by a heat-exchanger 208 disposed in a fluid tank 207, and recirculated. Braking effort is adjusted by changing the flow rate by means of a valve 209.

On the other hand, the electric retarder disperses in the form of ohmic heat the eddy current (Foucault current) generated when a rotor of the same kind as said fluid retarder rotates in a magnetic field between electromagnets.

In the above retarders, the output torque is finally changed to heat energy and the thusly transformed energy represents the braking energy. Thus, in order to raise braking efficiency, a device for cooling the working medium is necessary. Disposition of such a device is troublesome in terms of spacing and cost.

SUMMARY OF THE INVENTION

One object of this invention is to provide an engine braking system whose working medium does not need cooling and which lets the output shaft of the engine perform braking work against itself.

In order to achieve the above object, there is provided an engine braking system equipped with an axial flow compressor that is connected to the engine output shaft so that said compressor is driven by said output shaft so as to throttle and discharge the inhaled air or exhaust gas in accordance with the rotation of the compressor.

Another object of the present invention is to provide an engine braking system that exerts an optimum braking effort on the output shaft of the engine in accordance with engine running conditions by letting the output shaft of the engine perform braking work against said output shaft, i.e., itself.

In order to attain the above object, the engine braking system of this invention includes: an axial flow compressor connected to the output shaft of the engine so as to be driven by the output shaft, and to throttle and discharge the air or exhaust gas inhaled and throttling means disposed at the discharging port or the inlet port of the axial flow compressor so as to adjust the throttling of said port based on running conditions of the engine.

Still another object of the present invention is to provide an engine braking system that includes a power turbine disposed in the exhaust passage of the engine so as to transmit energy recovered from the exhaust gas to the output shaft of said engine via a driving power transmitting means. Said power turbine serves as a part of the braking system.

In order to accomplish the above object, the braking system of the present invention comprises: a driving power transmitting means for connecting the output shaft of the engine and the power turbine in the exhaust passage during engine braking so that the rotative power of said output shaft is transmitted to said power turbine; and throttling means for changing the throttling of the nozzle throat of said power turbine.

Yet another object of the present invention is to provide an engine braking system that includes a power turbine disposed in the exhaust passage of the engine so as to transmit the recovered energy of exhaust gas to the output shaft of said engine via driving power transmitting means. Said power turbine serves as a part of the braking system, and the power turbine produces a braking effort which is optimized in accordance to driving conditions of said engine.

In order to fulfill the above object, the engine braking system of the present invention comprises: driving power transmitting means for connecting the output shaft of the engine to the power turbine disposed in the exhaust passage during engine braking so as to transmit the rotative driving power of said output shaft to said power turbine; throttling means for changing the throttling in the nozzle throat of said power turbine; actuation means for activating said throttling means; and a controller for controlling the actuation means based on running conditions of the engine during engine braking.

DESCRIPTION OF THE PREFERRED EMBODIMENTS

Preferred embodiments of the engine braking system of the present invention will be described with reference to the accompanying drawings.

First Embodiment

Figure 1:
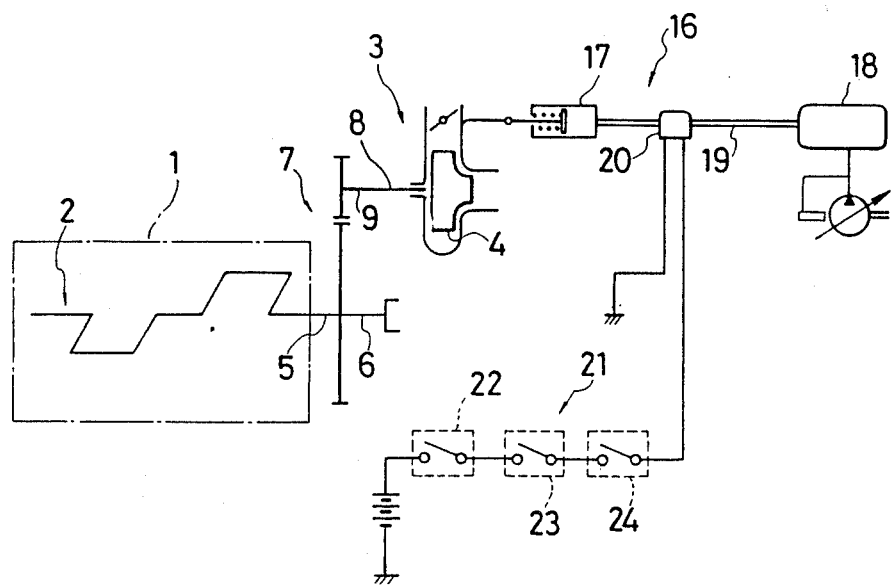
FIG. 1 is a system diagram, showing a first embodiment of the present invention.

FIG. 1 of the accompanying drawings depicts an embodiment of the engine braking system, specifically a impeller brake system. This system serves as an auxiliary brake relative to a main brake (not shown), and comprises a impeller 4 of an air compressor 3 with the impeller being connected to a crankshaft 2 of an engine 1.

An output shaft 5 of the crankshaft 2 is connected to a driving power transmitting shaft 6 for driving wheel axles (not shown), and includes a impeller brake accelerating gear 7 of predetermined gear ratio. An input shaft 8 of the power impeller 4 is integrally formed with an output shaft 9 of the accelerating gear 7 so that it is connected to the crank shaft 2 via the gear 7.

Figure 2:
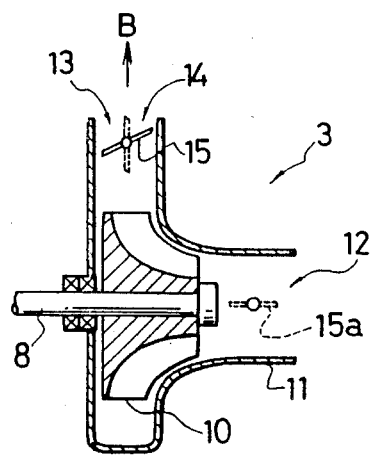
FIG. 2 is an enlarged view of a part of FIG. 1.

As illustrated in FIG. 2, the air compressor 3 includes an impeller 10 and an involute casing 11 for accomodation thereof. Within the casing 11, there are formed an inlet port 12 projecting outwardly in the axial direction of the input shaft 8, and an outlet port 13 projecting outwardly in the diametrical direction of the impeller 10. In the outlet port 13 there is formed a throttling portion 14 to obtain a desired air flow rate. In this embodiment, a valve 15 is disposed at a throttling portion 14 rotatably about the rotative shaft so that the outlet port 13 may be adjusted to a desired area A. The valve 15 can change the area A. Specifically, it is constructed in a manner such that when it is parallel to the discharging direction B (open), the area A becomes maximum, while when it is rotated to cross the direction B, the area A becomes minimum. Provision of the valve body 15 in the outlet port 13 is advantageous in terms of durability because the valve body 15 is not affected by the heat of the gas being throttled. To the valve 15, as shown in FIG. 1, an actuation means 16 is provided. The actuation means 16 includes an air cylinder 17 that can produce biasing force for rotation of the valve 15 to minimize the area, an air tank 18 that can produce air pressure or biasing force larger than that of the air cylinder 17, an electromagnetic valve 20 disposed at an intermediate point along a passage 19 communicating the air tank 18 with the air cylinder 17, and a switch 21 for opening and closing the electromagnetic valve 20.

A neutrality switch 22, a clutch switch 23, a impeller brake switch 24 are comprised in the switch 21, and the switches are disposed in series so that only when all the switches are turned ON (i.e., closed), the electromagnetic valve 20 is opened. The neutrality switch 22 is constructed in a manner such that it is ON except when the transmission (not shown) is in its neutral position. The clutch switch 23 is ON when the clutch (not shown) for connecting and disconnecting the driving power transmission is in its connecting position.

Now, the functioning of the brake system of this invention will be further explained.

During normal driving, when the crank shaft 2 of the engine 1 is rotating, the impeller 4 is driven with its rotating speed being increased by the accelerating gear 7. At this time, the valve 15 is rotated to its closed position by the air cylinder 17 so as to minimize the area A of the outlet port 13. In this case, power that drives the air compressor 3, which constitutes the braking effort being supplied by the impeller brake system, becomes minimum, whereby the engine 1 is hardly affected by the impeller brake system.

When circumstances demand use of the main brake of the vehicle, for instance before stopping or during running on a long down slope, the switch 21 of the electromagnetic valve 20 is turned ON. Then, the engine brake is operating. When the electromagnetic valve 20 is opened, the air cylinder 17 rotates the valve 15 to its open position since the pressure of the compressed air overwhelms the biasing force, thereby enlarging the area A to predetermined magnitude. In this case, the resistance force against the crankshaft 2 becomes maximum, producing the maximum braking effort against the engine 1 to be decelerated.

In this manner, kinetic energy is given to the air which serves as working medium, and the energy consumed by the air functions as braking force. Therefore, it is possible to obtain a braking force by only manipulating the valve 15 in the throttling portion 14.

The inventors of this invention conducted experiments on the relationship between the area A of the throttling portion 14 and the braking force using a system constructed in accordance with the illustrated embodiment, and according to the results therefrom, it was found that the braking effort F by the impeller brake system is given by the following equation:

$$F = Cp \times G \times To \times \{(P/Po)^{\frac{K-1}{K}} - 1\} \times \frac{1}{\alpha} \times Y$$

where
Cp: air isopiestic specific heat
G: air flow rate
To: external atmosphere temperature
Po: external atmosphere pressure
P: pressure by air compressor
K: ratio of specific heat
a: constant
Y: air compressor efficiency.

Figure 3:
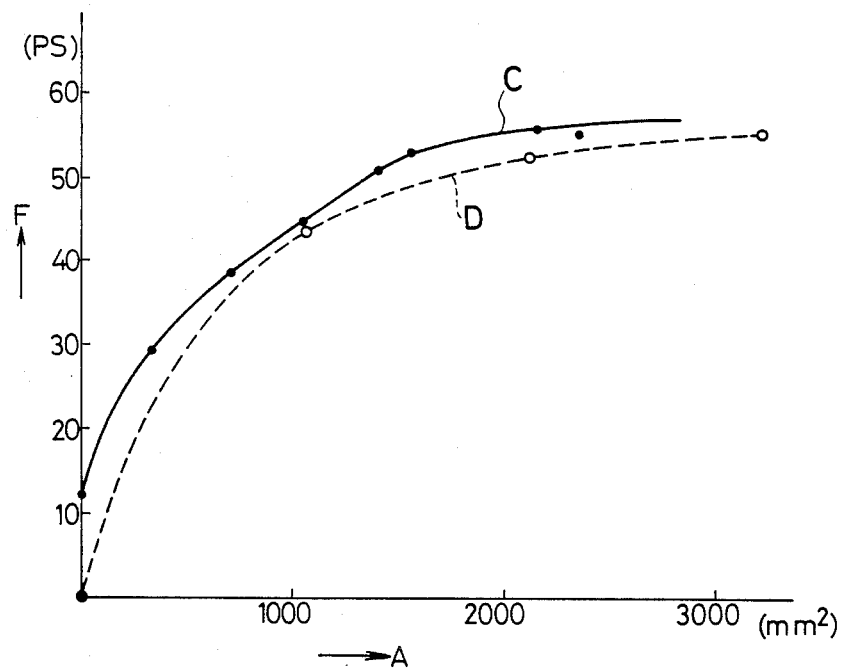
FIG. 3 is a characteristic diagram, showing a relation between area A of inlet port or outlet port and braking effort F.

As may be appreciated from the above equation, since the air flow rate G varies with the area A, the braking effort F can be changed by changing the area A. One example of the resulting relationship between A and F is depicted in FIG. 3. The area A of the outlet port 13 (that is, the area of the throttling portion 14) for the desired braking effort is determined by the solid line C. The dotted line D in FIG. 3 indicates a case where a throttling valve 15a is disposed on the side of the inlet port 12. As seen in FIG. 3, the braking effort F acquired or obtained in accordance with the solid line C is larger than that in accordance with the dotted line D at the same area A. Hence, it is preferable to dispose the throttling portion 14, as shown in FIGS. 1 and 2, in the side of outlet port 13. In this particular embodiment, since the impeller of the air compressor is connected to the crankshaft instead of the retarder conventionally utilized as a braking system, means for cooling the working medium is not necessary, thereby saving space for the entire brake system as well as the expense therefor.

Second Embodiment

A second embodiment of the present invention will be described with a turbo compound engine illustrated in the accompanying drawings.

Figure 5:
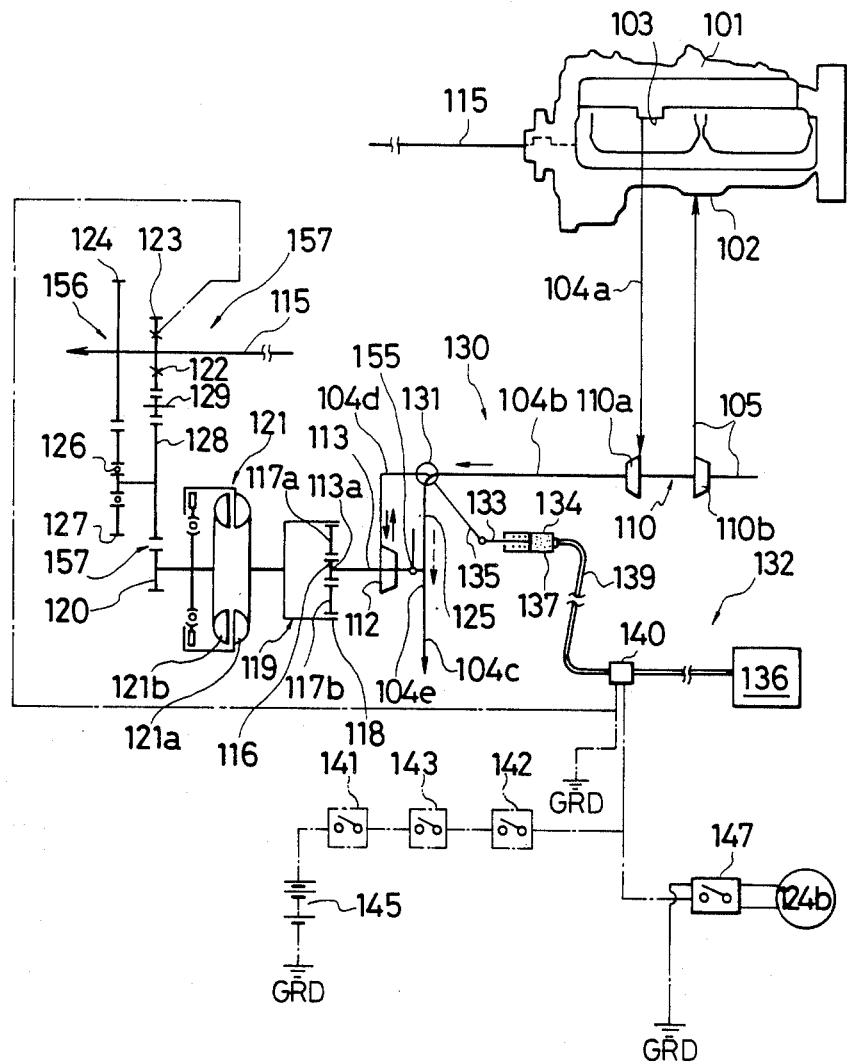
FIG. 5 is a system diagram, showing a second embodiment of the present invention equipped with the throttling means of FIG. 4.

In FIG. 5 of the accompanying drawings, reference numeral 101 indicates an engine, 102 an intake air port, and 103 an exhaust port.

As depicted in FIG. 5, an exhaust passage consists of exhaust passage portions 104a, 104b, 104c, 104d, and 104e. The upstream part thereof, namely portion 104a is connected to the exhaust port 103, and an intake passage 105 is connected to the intake port 102.

A turbine 110a of a turbocharger 110 is disposed in the exhaust passage 104a, and a compressor 110b of the turbocharger 110 is in the intake passage 105. In the exhaust passage portion 104d downstream of the turbocharger 110, there is disposed a power turbine 112 for recovering the exhaust gas energy.

One objective of the turbo compound engine of this embodiment is to ensure an engine braking effort which is adequate for the output performance of the engine 101. In order to increase the engine braking effort, it is considered to be effective to impose a resistance force against the rotation of the crankshaft 115 directly or indirectly so that the crankshaft 115 performs a large negative work.

In the turbo compound engine of this embodiment, the power turbine 112 is rotated in a reverse sense during exhaust braking so that the power turbine 112 performs a large negative work.

To the exhaust passage 104b between the power turbine 112 and the turbine 110a of the turbocharger 110, as depicted in FIG. 5, a fluid passage 125 is connected at one end, and the other end thereof is connected to the exhaust passage 104c downstream of the power turbine 112. A passage switching means 130 is disposed at one junction of the fluid passage 125 upstream of the power turbine 112.

Figure 6:
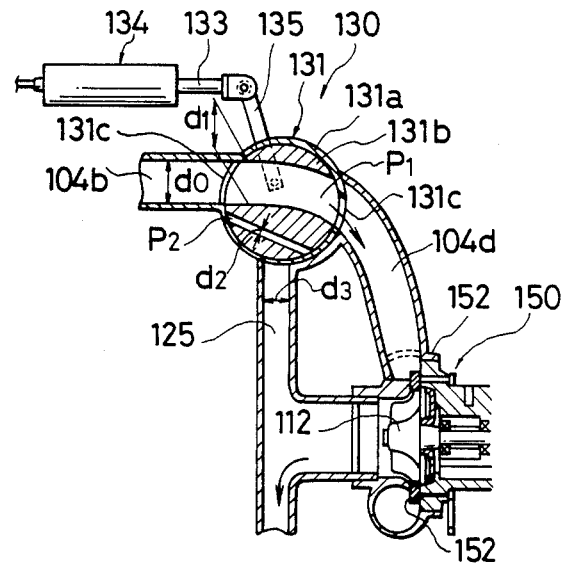
FIGS. 6 and 7 are enlarged views, showing another throttling means and gas passage switching means.
Figure 7:
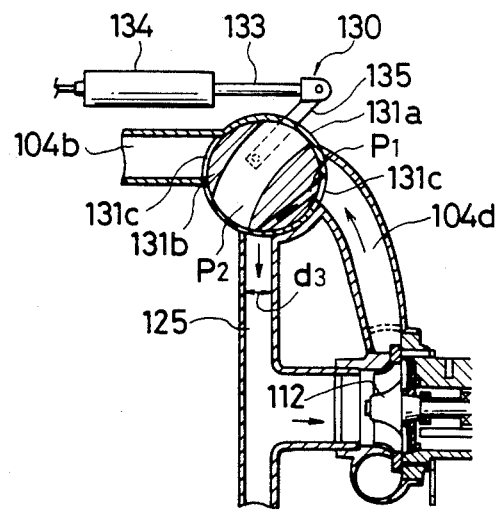
Figures 1, 8A:
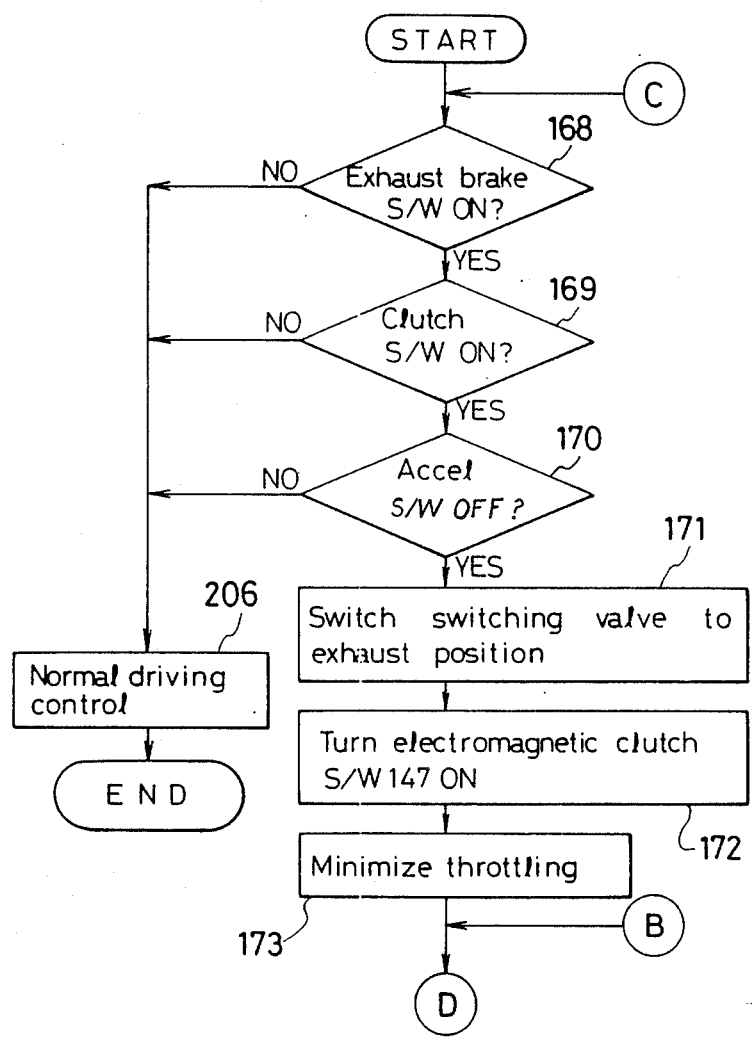
FIGS. 8(a) and 8(b) form a single; flow sheet, showing control of a controller.
Figures 2, 8A:
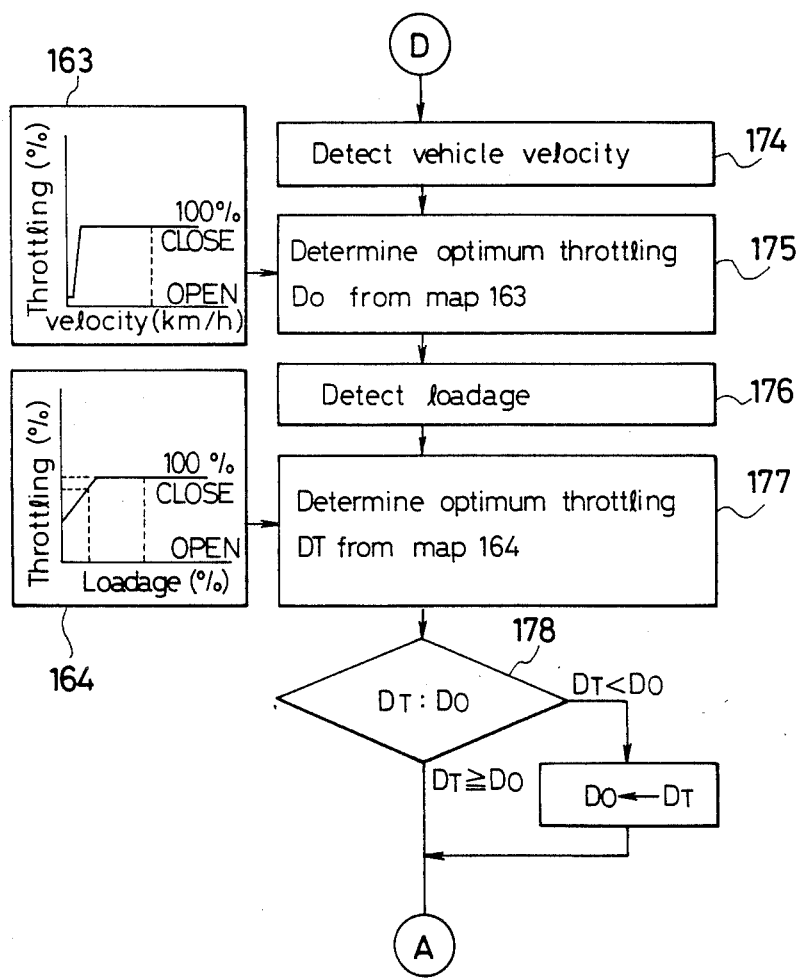
Figures 1, 8B:
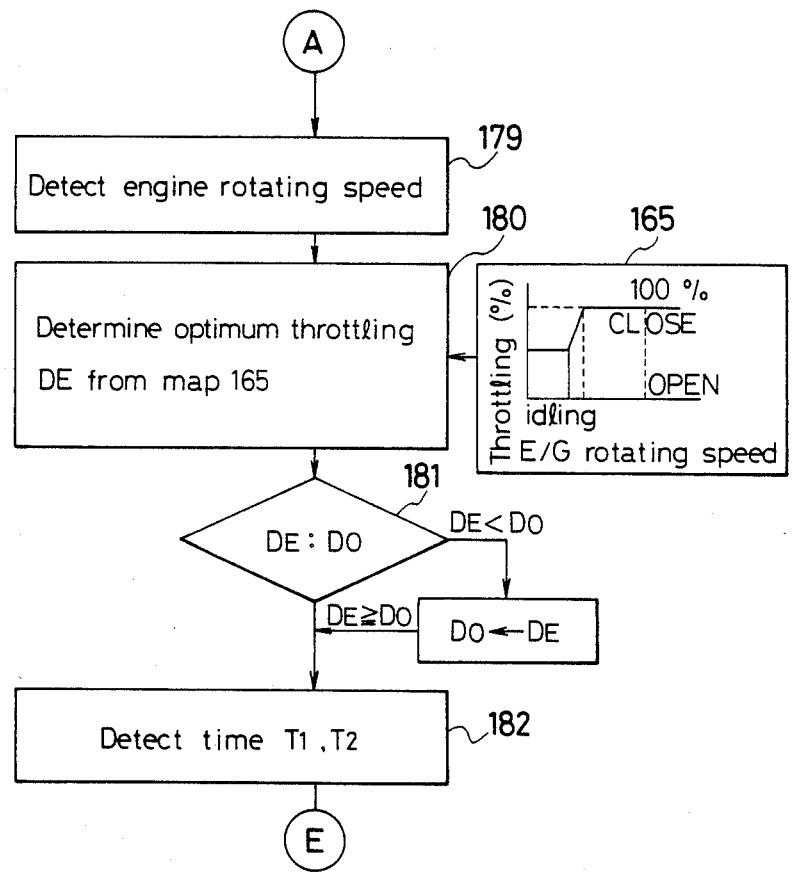
Figures 2, 8B:
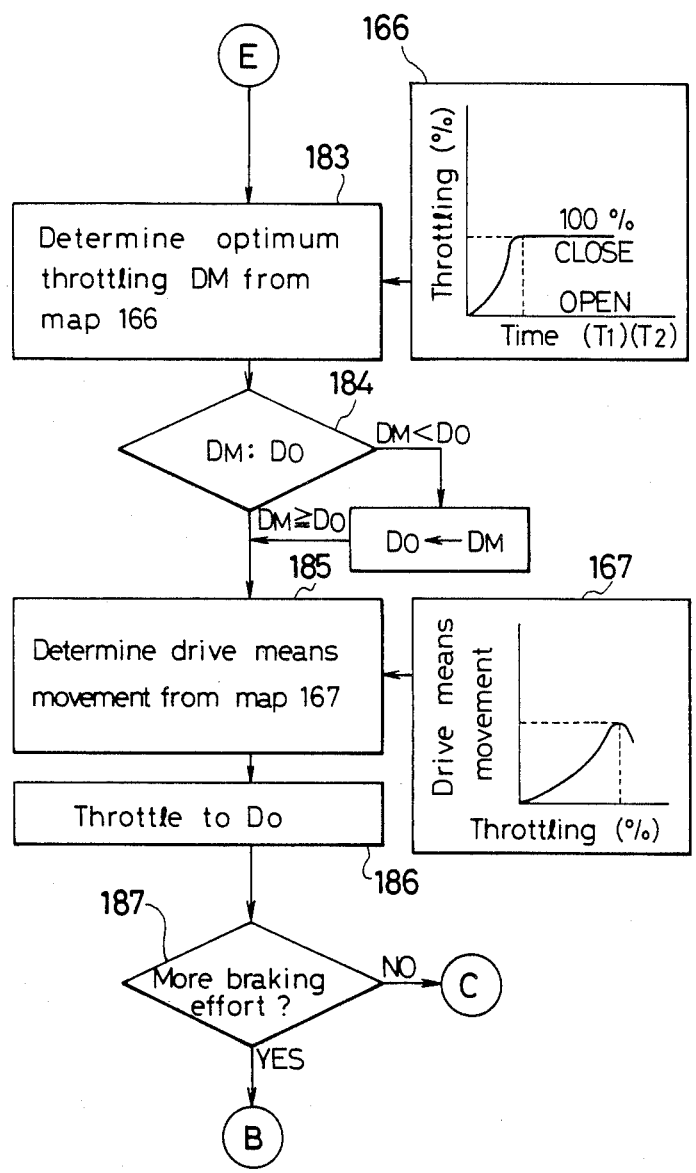
Figure 9:
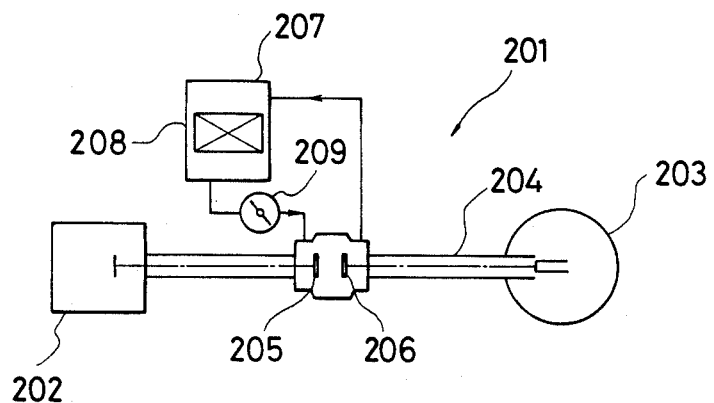
FIG. 9 is a system diagram, illustrating a conventional engine braking system.

In this illustrated embodiment, the passage switching means 130, as shown in FIGS. 5–7, comprises a rotary valve 131 as a switching valve, which is provided at said junction, and an actuation means 132 for the rotary valve 131. The rotary valve 131, as depicted in FIGS. 6 and 7, has a rotor 131b housed in a casing 131a. Two ports, namely a first port P1 and a second port P2, are formed in the rotor 131. The diameter of first port P1 d1 is equal to the diameter of the exhaust passage 104b, d0, while the diameter of the second port P2, d2 is smaller than the diameter of the fluid passage 125, d3.

In the casing 131a, on the other hand, an opening 131c is formed as a part of the exhaust passage 104b. The first port P1 and the second port P2 are formed in a manner such that the exhaust passage 104b is disconnected from the fluid passage 135 when the exhaust passage 104b is connected to the first port P1.

A drive mechanism or means 132 for switching-control of the rotary valve 131 is constructed as described below.

As shown in FIGS. 5 and 6, a lever member 135 is connected to the rotor 131b at one end, and the other end thereof, which extends outwardly in the radial direction of the exhaust passage 104b, is connected to a rod 133 of an actuator 134.

Referring to FIG. 5, reference numeral 136 indicates a fluid feeding apparatus. This feeding apparatus 136 and the actuation chamber 137 of said actuator 134 are connected to each other by a fluid feeding passage 139. At an intermediate point of the fluid feeding passage 139, there is disposed an electromagnetic valve 140 that connects said actuation chamber 137 to the fluid feeding passage 139 when an electric current is supplied thereto. The electromagnetic valve 140 is turned ON only when a neutrality sensing switch 141 of the engine 101, a clutch actuation switch 142, and an exhaust brake switch 143 are all turned ON. Reference numeral 145 indicates a DC electric source such as a battery. Numeral 147 indicates an electromagnetic clutch switch for a reverse mode, and it is a normally open contact.

Now, a gear train for connecting the power turbine 112 to the crankshaft 115 will be explained.

As illustrated in FIG. 5, an output gear 116 is integrally disposed at an output end 113a of the turbine shaft 113 of the power turbine 112. The output gear 116 is engaged with planetary gears 117a and 117b. These gears 117a and 117b are engaged with a ring gear 118 which rotates with an input pump wheel 121a of a fluid coupling 121.

In other words, the output gear 116 is connected to the fluid coupling 121 via planetary gearing 119 consisting of the the planetary gears 117a and 117b, and the ring gear 118, so that the rotative power of the power turbine 112 is transmitted to the output pump wheel 121b of the fluid coupling 121.

The planetary gearing 119 is employed because of its large reduction ratio and high transmission efficiency. An input-output gear 120 is fixed to the output pump wheel 121b so they rotate together.

The crankshaft 115 has a first crankshaft gear 123 which can be disconnected by an electromagnetic clutch 122 and a second crankshaft gear 124. The second crankshaft gear 124 is engaged with a second intermediate gear 127 equipped with a one-way clutch 126. The second intermediate gear 127 is connected to the input-output gear 129 via a first intermediate gear 128 having a mutual axis with the gear 127.

The first intermediate gear 128 and the first crankshaft gear 123 are connected to each other by a reverse idle gear 129. When the electromagnetic clutch 122 is ON, that is to say, when said electromagnetic clutch switch 147 is ON, the first crankshaft gear 123 is connected to the first intermediate gear 128 so that the rotative power is transmitted from the crankshaft 114 to the input-output gear 120. In this case, the rotative power is not transmitted between the second intermediate gear 127 and the second crankshaft gear 124 because of the one-way clutch 126, since the one-way clutch 126 is rotating freely.

A gear ratio for each gear, namely the first crankshaft gear 123, the idle gear 129, the first intermediate gear 128, and the input-output gear 120, is determined in a manner such that the gear ratio between the first crankshaft gear 123 and the input-output gear 120 is small compared with that between the input-output gear 120 and the second crankshaft gear 124. This is to prevent the power turbine 112 from overrunning when the rotative power is transmitted from the crankshaft 115 to the power turbine 112 at the engine rated speed. In this embodiment, the gear ratio between the first crankshaft gear 123 and the first intermediate gear 128 is set smaller than that between the second crankshaft gear 124 and the second intermediate gear 127.

Here, the second crankshaft gear 124, the one-way clutch 126, the first intermediate gear 128, and the input-output gear 120 constitute a gear train 156 that transmits the rotation from the power turbine 112 to the crankshaft 115, while the first crankshaft gear 123, the idle gear 129, the first intermediate gear 128, and the input-output gear 120 constitute another gear train 157 that transmits the rotation from the crankshaft 115 to the power turbine 112.

Figure 4:
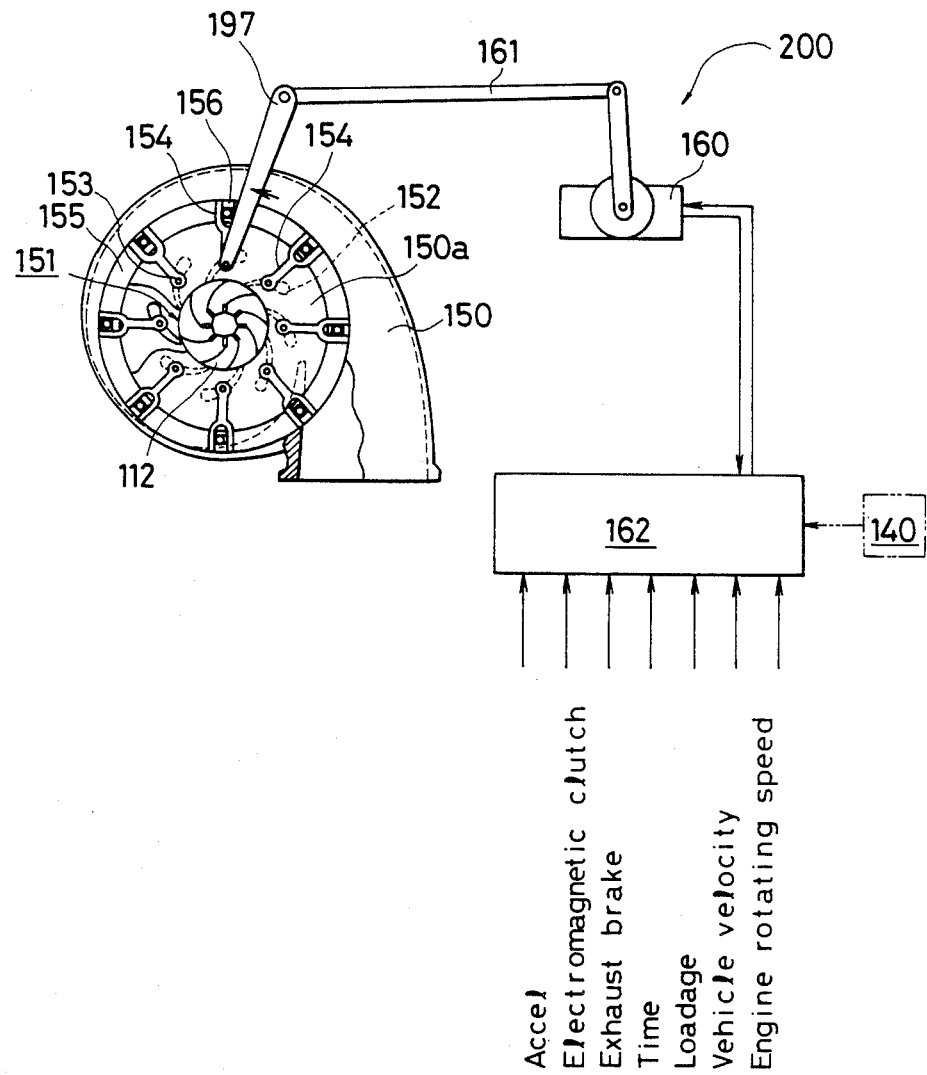
FIG. 4 is an enlarged view, showing throttling means.

Referring to FIG. 4, drive means 200 is provided to the power turbine 112. The drive means 200 is, more precisely, provided to the housing 150 of the power turbine 112 so that each movable nozzle vane 152 is adjusted in accordance with running conditions of the engine. Each nozzle vane 152 changes a throat area 151 of the power turbine 112 so that it serves as a throttling means for adjusting workload of the power turbine 112 in accordance with velocity of fluid supplied thereto.

Next, the construction of the movable nozzle vane 152 will be described.

As depicted in FIG. 4, within the inner wall 150a of the housing 150 of the power turbine 112, the movable nozzle vanes 152 are spacedly disposed along the circumference of said inner wall, with each nozzle vane 152 being movable in the radial direction as well as in the circumferential direction of said housing. In the illustrated embodiment, nozzle vanes of wing type are employed. Each nozzle vane 152 is pivotably supported by a rotative shaft 153 penetrating the housing 150 in the direction of power turbine's shaft so that the angle of the nozzle vane can be changed.

The drive mechanism 200 now will be described.

At that end of each rotative shaft 153 which penetrates the housing 150, a lever member 154 is integrally attached at one end thereof. The other end of each lever member 154 is engaged with an engaging portion 156 of a control ring 155.

It is a matter of course that the control ring 155 and the movable nozzle vane 152 are constructed in a manner such that the nozzle throat areas 151 (called "throttling" hereinafter) formed by the power turbine 112 and nozzle vanes 152 are equal to each other.

The control ring 155 is prevented from moving in the axial direction relative to the housing 150, and the end of the lever member 154 is also prevented from moving in the axial direction relative to the control ring 155.

To one of the rotative shafts 153, there is fixed a control lever 197 at one end, which has a point of application, via the lever member 154, so as to actuate the control ring 155. Thus, when the control lever 154 is rotated, the control ring 155 is rotated acompanying the nozzle vanes 152.

The control lever 197 is connected via a linkage 161 to a stepper motor 160 moved by a controller 162 which will be described later.

The stepper motor 140 is employed as an actuation means for the control lever 197 in this particular embodiment although, any other device would be satisfactory as long as it could adjust the stroke of the linkage 161 by the controller 162.

The construction of the controller 162 and the control achieved thereby will now be explained.

As shown in FIG. 4, vehicle velocity, engine rotating speed, loadage, and time are fed as input signals to the input of the controller 162. Said time is time passed since the step motor 160 has driven the nozzle vanes 152 to a certain optimum position. Besides the above signals, an ON-OFF signal of the exhaust brake switch 143, an ON-OFF signal of the electromagnetic clutch switch 142, an ON-OFF signal of the accel switch i.e., accelerator switch (not shown), and an ON-OFF signal of the electromagnetic valve 146 are supplied to the input of the controller 162. The output of the controller 162 is connected to the controller of the stepper motor 160.

The controller 162, as shown in FIG. 8, has already stored various data obtained by experiments in suitable data structures such as maps 163, 164, 165, 166, and 167. The stored data in the maps 163-167 are compared with the input data in the controller 162, and the stepper motor 160 is controlled based on the data resulting from the above comparison.

Referring to FIG. 8, the control by the controller 162 now will be described.

First, the control during normal driving will be explained.

The program proceeds to the step 206 for normal driving when the exhaust brake switch 143 is OFF at the step 168, the clutch switch 142 is OFF at the step 169, or the accel switch is OFF at the step 170.

In the above case, as shown in FIGS. 5 and 6, when the exhaust brake switch 143 is OFF, the electromagnetic valve 140 is OFF. Thus, the exhaust passage 104d just upstream of the power turbine 112 and the exhaust passage 104b upstream of the rotary valve 131 are connected to each other via the first port P1. Therefore, the energy of the exhaust gas transferred from the engine through the exhaust port 103 and the exhaust passage 104a is recovered by the turbine 110a of the turbocharger 110. Since the turbine 110a drives the compressor 110b disposed on the same axis as the turbine 110a is disposed, the compressed air is supplied into the cylinders of the engine 101. The exhaust gas from the turbine 110a gives a rotative power to the power turbine 112. This means that the remaining energy of the exhaust gas is recovered by the power turbine 112. In this case, the electromagnetic clutch 122 is OFF so that the exhaust gas energy recovered by the power turbine 112 is transmitted to the crankshaft 115 via the planetary gearing 119, the gear 120, the second intermediate gear 127, and the second crankshaft gear 124, with its rotating speed being reduced at the planetary gearing 119.

Here, it is possible to adjust the degree of opening by the nozzle vane 152 in a range that prevents the power turbine 112 from overruning so as to effectively recover the exhaust gas energy. The control in this case is performed, for example, by the controller 162 based on the map storing the engine running conditions.

Now, the control during exhaust braking will be explained.

When all the answers at the steps 168, 169, and 170 are YES, the control for exhaust braking is performed.

During exhaust braking, the neutrality sensing switch 141, the clutch switch 143, the accel switch, and the exhaust brake switch 143 are all ON. Thus, the electromagnetic switch 147 is turned ON at step the 172, turning the electromagnetic valve 140 ON. Then, the working fluid is supplied to the actuation chamber 137 of the actuator 134 from the fluid feeding apparatus 136. In other words, the step 171 is executed so that the rod 133 moves the rotary valve 131 via the lever member 135, thereby closing the exhaust passage 104b and connecting the the exhaust passage 104d downstream of the rotary valve 131 to the fluid passage 125 via the second port P2. After that, in the controller 162, the step 173 is executed, adjusting the step motor 160 to the minimum throttling, i.e., to a setting where the nozzle throat area is at a maximum. Then at the step 174 the vehicle velocity is detected.

Therefore, while the rotative power is not supplied to the power turbine 112, the rotative power of the crankshaft 115 is transmitted to the input-output gear 120 and the fluid coupling 121 via the first crankshaft gear 123 and the first intermediate gear 128. The power turbine 112, as depicted in FIG. 7, is rotated in a reverse sense, so that it serves as a compressor of low efficiency which feeds the gas from the exhaust passage 104c downstream of the power turbine 112 to the junction of the fluid passage 125. The gas fed to the fluid passage 125 is throttled and accelerated through the second port P2. The gas agitating work and compressing work by the power turbine 112 lets the crankshaft 115 perform a large negative work. Hence, during exhaust braking, an optimum engine braking effort is achieved which includes the above-mentioned negative work in addition to any other negative work produced by the exhaust brake and a normal engine brake. This engine braking effort is adjusted so that it does not exert an undue resistance against the driving system of the vehicle. The exhaust braking effort is produced by actuating an exhaust brake valve (not shown) disposed downstream of the exhaust port 103. As the exhaust resistance, that is to say pumping work, increases upon fully closing the exhaust brake valve, an engine braking effort by the exhaust brake system is imposed on the engine. Here, the diameter of the second port P2, d2, is determined with regard to the configuration of the power turbine 112 so as to prevent the power turbine 112 from overrunning (see FIGS. 6 and 7).

After detecting the vehicle velocity at the step 174 in the controller 162, the program proceeds to the step 175 at which time the detected vehicle velocity is compared with the data stored in the map 163 to determine an optimum throttling DO. At the step 176 a loadage of the vehicle is detected, and another optimum throttling DT is obtained at the step 177. The thusly obtained DO and DT values are compared with each other in order to choose one of them at the step 178. Specifically, if DT<DO, DT is chosen as the optimum throttling. If DT≧DO, DO is chosen. In a word, the smaller one is picked.

The controller 162 detects the engine rotating speed at the step 179, and at the step 180 an optimum throttling DE relative to the detected engine rotating speed is obtained from the map 165. After that, at step 181 the controller determines which has priority, DE or DO. If DE<DO, the value of DE is chosen and assigned to that of DO as the optimum value, while if DE≧DO, DO is chosen as the optimum throttling.

The controller 162 next checks at the step 182 the, time T 1 passed since the stepper motor 160 has been activated. At the step 183, an optimum throttling DM and time T 2 to maintain the optimum throttling DM are determined from the map 166 based on the time T 1. Then, it is determined which has to be chosen, DO or DM at the step 184. If DM<DO, the value of DM is assigned to DO, while if DM≧DO, the value of DO comes out from the step 184. The thusly obtained value of DO is the final optimum throttling, and the movement of the stepper motor 160 relative to DO, namely the moving angle (step angle) of the stepper motor 160 is determined at the step 185. And at the step 186, the stepper motor 160 is activated according to the thusly determined moving angle.

Here, at the steps 178, 181, and 184, the minimum and optimum throttling DO is determined by judging the priority, with respect to parameters, namely, the parameters of vehicle velocity, loadage, the engine rotating speed, and the time T 1 passed, so that a large exhaust brake force is not applied to the driving systems of the engine and the vehicle at one time. Whether the circumstance still demands more exhaust brake, is a judgement made at the step 187. And, if the answer is YES, the program returns to the step 174 and repeats the above described procedure until step 186, whereby the optimum and munimum exhaust brake force is cyclically applied based on the driving condition of the vehicle. Hence, during exhaust braking, a large driving power is not applied to the driving system of the vehicle, and therefore abnormal wear of the brake pads and shoes is prevented, and shock to the vehicle driver is reduced.

In this embodiment, it is acceptable to dispose a three-way valve 155 in the exhaust passage 104c near the junction 104e of the exhaust passage 104c downstream of the power turbine 112 and the fluid passage 125. This construction makes it possible during exhaust braking to close the exhaust passage 104c and directly introduce the external atmosphere which is cleaner than the exhaust gas.

In the illustrated embodiment, the switching between the exhaust passage 104 and the fluid passage 125 is executed by the rotary valve 131. However, the means for accomplishing such switching need not be limited to the rotary valve. For instance, when the driving rotation of a reverse sense is transmitted from the crankshaft 115 to the power turbine 112 during exhaust braking, it is permissible to provide an opening-closing valve and a throttling valve in a manner such that the opening-closing valve opens the exhaust passage 104b upstream of the fluid passage 125 and the throttling valve converges or constructs the fluid passage 125. It is also satisfactory to form a converging portion within the fluid passage 125 itself to a certain degree beforehand, and to open/close the exhaust passage 104b upstream of the fluid passage 125. In employing the rotary valve 131, the diameter of the port P2, d2 is determined in a manner such that the power turbine 112 will not go into over-running condition even when the nozzle vanes 152 are moved in a manner which minimizes the throat area.

Accordingly in this embodiment, since a suitable exhaust braking effort is applied which depends on the running conditions of a vehicle during exhaust braking, the resistance force which may damage the vehicle driving system, and cause skidding of the tires will not occur. Thus, the reliability and durability of the braking system and the vehicle are improved.

What is claimed is:

1. An engine braking system for use with an engine provided with a rotatable output shaft, an accelerator, an exhaust passage, and a clutch and transmission coupled with the engine, the system comprising:
    nozzle means disposed in the exhaust passage of the engine and defining a nozzle throat area;
    a power turbine disposed in the exhaust passage downstream of the nozzle means;
    throttling means for changing the nozzle throat area of said nozzle means; and,
    driving force transmitting means for connecting the output shaft of the engine to the power turbine so as to transmit rotative power of said output shaft to said power turbine when the accelerator is released to decelerate the engine, the clutch is engaged, the transmission is engaged and the nozzle throat area is reduced by the throttling means.

2. The engine braking system of claim 1, wherein said driving force transmitting means includes a gear train.

3. The engine braking system of claim 2, wherein said gear train has an input side and an output side and includes a clutch for disconnecting the input side from the output side.

4. The engine braking system of claim 1, wherein said power turbine is rotatably housed in the exhaust passage which is configured to form a nozzle throat to drive said power turbine and which contains the nozzle throat area.

5. The engine braking system of claim 1, wherein said throttling means comprises:
    plural vane shafts and plural movable nozzle vanes each respectively associated with one of the vane shafts and disposed within said exhaust passage spacedly along a circumferential direction of said power turbine, with each nozzle vane being pivotable about its respective shaft to change the area of said nozzle throat;

a control lever;

a control ring engaged by the control lever and integrally connected to the shafts for said nozzle vanes so as to move said nozzle vanes when the control lever is moved; and drive means for driving said control ring via said control lever.

6. An engine braking system for use with an engine provided with a rotatable output shaft, an accelerator, an exhaust passage, a clutch, a transmission and an exhaust brake system for throttling the exhaust passage, said engine braking system comprising:

nozzle means disposed in the exhaust passage of the engine and defining a nozzle throat area;

a power turbine disposed in the exhaust passage downstream of the nozzle means;

a throttling means for changing the nozzle throat area of said nozzle means; and, driving force transmitting means for connecting the output shaft of the engine to the power turbine in a manner such that the rotative power of said output shaft is transmitted to said power turbine when the accelerator is released to decelerate the engine, the clutch is engaged, the transmission is engaged, the exhaust brake system is throttling the exhaust passage and the nozzle throat area is reduced by the throttling means.

7. The engine braking system of claim 6, wherein said driving force transmitting means includes a gear train.

8. The engine braking system of claim 6, wherein said gear train includes an input side and an output side and a clutch for disconnecting the input side of the gear train from the output side of the gear train.

9. The engine braking system of claim 6, wherein:
said engine includes an exhaust passage;
and wherein said power turbine is rotatably housed within said exhaust passage and said nozzle throat area is defined in said exhaust passage upstream of said power turbine.

10. The engine braking system of claim 6, wherein said throttling means includes:

a plurality of nozzle vane shafts and a plurality of movable wing-type nozzle vanes each respectively associated with one of the vane shafts and disposed in said exhaust passage, the nozzle vanes being pivotable about their respective vane shafts and spacedly disposed in a circumferential direction of said power turbine so that the nozzle vanes can change said nozzle throat areas;

a control lever which is connected to said shafts of the movable nozzle vanes;

a control ring for interlockingly moving said movable nozzle vanes;

drive means for actuating said control ring; and a controller for controlling said drive means in accordance with running conditions of said engine.

11. The engine braking system of claim 10 for use on a vehicle powered by said engine, wherein said controller controls said drive means based on a degree of throttling of said movable nozzle vanes obtained from a map of throttling versus vehicle velocity stored in the controller, and the latest data of vehicle velocity are consecutively fed to the controller during engine braking.

12. The engine braking system of claim 10 for use on a vehicle powered by said engine, wherein said controller controls said drive means based on a degree of throttling of said movable nozzle vanes obtained from a map of throttling versus vehicle loadage stored in the controller, and the latest data of vehicle loadage are consecutively fed to the controller during engine braking.

13. The engine braking system of claim 10, wherein said controller controls said drive means based on a degree of throttling of said movable nozzle vanes obtained from a map of throttling-engine rotating speed stored in the controller, and the latest data of engine rotating speed are consecutively fed to the controller during engine braking.

14. The engine braking system of claim 10, wherein said controller controls said drive means based on a degree of throttling of said movable nozzle vanes obtained from a map of throttling versus elapsed time stored in the controller, and the latest data of said time are consecutively fed to the controller during engine braking.

15. The engine braking system of claim 10 for use on a vehicle powered by said engine, wherein said controller controls said drive means based on a minimum degree of throttling of said movable nozzle vanes among degrees of throttling obtained from maps of throttling versus vehicle velocity, throttling versus vehicle loadage, throttling versus engine rotating speed, and throttling versus elapsed time, stored in the controller, and the latest data of vehicle velocity, vehicle loadage, engine rotating speed, and elapsed time are consecutively fed to the controller during engine braking.

16. An engine braking system for use with an engine provided with a rotatable output shaft, an accelerator, an exhaust passage, a clutch, a transmission, and an engine brake system for throttling the exhaust passage, said engine braking system comprising:

nozzle means disposed in the exhaust passage of the engine and defining a nozzle throat area;

a power turbine having an axis of rotation and disposed in the exhaust passage downstream of the nozzle means, the power turbine being rotatable in first and second opposite directions of rotation about said axis;

driving force transmitting means for connecting the output shaft of the engine to the power turbine and for rotating the power turbine in said first direction in a manner such that the rotative power is transmitted from the output shaft to the power turbine when the accelerator is released, the clutch is engaged, the transmission is engaged, and the exhaust brake system is throttling the exhaust passage, and for otherwise connecting the output shaft to the power turbine to rotating the power turbine in said second direction of rotation in a manner such that the rotative power is transmitted from the power turbine to the output shaft;

a fluid passage connected to the exhaust passage between the engine and the power turbine;

switching means for throttling said fluid passage to a preselected degree when the power turbine rotates in said first direction of rotation thereof;

throttling means for adjusting the nozzle throat area; and, a controller for controlling said throttling means when the power turbine rotates in said first direction of rotation thereof.

17. The engine braking system of claim 16, wherein said driving power transmitting means includes a gear train.

18. The engine braking system of claim 17, wherein said gear train includes an input side and an output side and a clutch for disconnecting the input side of the gear train and the output side of the gear train.

19. The engine braking system of claim 16, wherein said power turbine is rotatably housed by the exhaust passage, which is configured to form a nozzle throat to drive said power turbine.

20. The engine braking system of claim 16, wherein said throttling means includes:
- a plurality of vane shafts and movable wing-type nozzle vanes respectively associated with the vane shafts and disposed in said exhaust passage, the nozzle vanes being pivotable about their respective vane shafts and spacedly disposed in a circumferential direction of said power turbine so that the nozzle vanes can change said nozzle throat areas;
- a control lever connected to said shafts of the movable nozzle vanes;
- a control ring for interlockingly moving said movable nozzle vanes; and
- drive means for actuating said control ring.

21. The engine braking system of claim 16, wherein said passage switching means includes a switching valve for closing said exhaust passage upstream of said fluid passage during engine braking and for opening the fluid passage to a predetermined degree, and a valve activating device for said valve.

22. The engine braking system of claim 21, wherein said switching valve includes a rotary valve having a first port whose diameter is equal to the diameter of said exhaust passage and a second port whose diameter is smaller than the diameter of said fluid passage, and movable by said valve activating device, to connect said second port and said fluid passage while disconnecting said first port and said exhaust passage during engine braking.

23. The engine braking system of claim 20 for use in a vehicle including said engine, wherein said controller controls said throttling means based on a degree of throttling of said movable nozzle vanes obtained from a map of throttling versus vehicle velocity stored in the controller, and the latest data of vehicle velocity are consecutively fed to the controller during engine braking.

24. The engine braking system of claim 20 for use in a vehicle including said engine, wherein said controller controls said throttling means based on a degree of throttling of said movable nozzle vanes obtained from a map of throttling versus vehicle loadage stored in the controller, and the latest data of vehicle loadage are consecutively fed to the controller during engine braking.

25. The engine braking system of claim 20, wherein said controller controls said throttling means based on a degree of throttling of said movable nozzle vanes obtained from a map of throttling versus engine rotating speed stored in the controller, and the latest data of engine rotating speed are consecutively fed to the controller during engine braking.

26. The engine braking system of claim 20, wherein said controller controls said throttling means based on a degree of throttling of said movable nozzle vanes obtained from a map of throttling versus elapsed time stored in the controller, and the latest data of time are consecutively fed to the controller during engine braking.

27. The engine braking system of claim 20 for use in a vehicle including said engine, wherein said controller controls said throttling means based on a minimum degree of throttling of said movable nozzle vanes among degrees of throttling obtained from maps of throttling versus vehicle velocity, throttling versus vehicle loadage, throttling versus engine rotating speed, and throttling versus elapsed time stored in the controller, and the latest data of vehicle velocity, vehicle loadage, engine rotating speed, and elapsed time are consecutively fed to the controller during engine braking.

* * * * *